(12) United States Patent
Roba et al.

(10) Patent No.: US 7,409,126 B2
(45) Date of Patent: Aug. 5, 2008

(54) OPTICAL FIBER HAVING A LOW POLARIZATION MODE DISPERSION AND PROCESS AND APPARATUS FOR PRODUCING IT

(75) Inventors: Giacomo Stefano Roba, Monza (IT); Davide Sarchi, Milan (IT); Martino Travagnin, San Donato Milanese (IT); Alexis Debut, Milan (IT)

(73) Assignee: Prysmian Cavi e Sistemi Energia S.R.L., Milan (IT)

( * ) Notice: Subject to any disclaimer, the term of this patent is extended or adjusted under 35 U.S.C. 154(b) by 157 days.

(21) Appl. No.: 10/528,836

(22) PCT Filed: Sep. 22, 2003

(86) PCT No.: PCT/EP03/10517

§ 371 (c)(1),
(2), (4) Date: Feb. 7, 2006

(87) PCT Pub. No.: WO2004/028989

PCT Pub. Date: Apr. 8, 2004

(65) Prior Publication Data

US 2006/0147166 A1    Jul. 6, 2006

(30) Foreign Application Priority Data

Sep. 25, 2002    (WO) ................ PCT/EP02/10737

(51) Int. Cl.
*G02B 6/44* (2006.01)
(52) U.S. Cl. ...................... 385/100; 385/104
(58) Field of Classification Search ............. 385/100
See application file for complete search history.

(56) References Cited

U.S. PATENT DOCUMENTS 4,504,300 A    3/1985   Gauthier et al.

(Continued)

FOREIGN PATENT DOCUMENTS

DE         195 04 521 A1    8/1996

(Continued)

OTHER PUBLICATIONS

Furukawa Electric Co. Ltd,: "Coated Optical Fibre Production Comprises Spinning Fibre Pre-Form Into Fibre, Forming Coatings on Periphery of Fibre and Winding Coated Fibre Around Bobbin Using Capstan", Derwent Publications Ltd., Abstract of JP 61 168550 A, Jul. 30, 1986.

(Continued)

*Primary Examiner*—Frank G Font
*Assistant Examiner*—Mary A El Shammaa
(74) *Attorney, Agent, or Firm*—Finnegan, Henderson, Farabow, Garrett & Dunner, L.L.P.

(57) ABSTRACT

An apparatus for producing a low-PMD optical fiber having a furnace for melting a lower portion of an optical preform; a traction device for pulling an optical fiber from the lower portion of an optical preform; a spinning device for imparting a substantially constant and unidirectional spin to the optical fiber as it is pulled, which causes the fiber to undergo an elastic torsion; a winding device for winding the optical fiber onto a reel; and a twisting device for imparting to the spun optical fiber a unidirectional twist in a direction opposite the elastic torsion, so as to control the residual twist in the optical fiber. A process for producing the fiber, an optical fiber and a cable are also provided.

25 Claims, 11 Drawing Sheets

U.S. PATENT DOCUMENTS

| | | |
|---|---|---|
| 4,969,941 A | 11/1990 | Kyoto et al. |
| 5,076,104 A | 12/1991 | Glaesemann et al. |
| 5,114,338 A | 5/1992 | Tsuchiya et al. |
| 5,298,047 A | 3/1994 | Hart, Jr. et al. |
| 5,316,562 A | 5/1994 | Smithgall et al. |
| 5,418,881 A | 5/1995 | Hart, Jr. et al. |
| 5,581,647 A | 12/1996 | Onishi et al. |
| 2001/0020374 A1 | 9/2001 | Roba et al. |
| 2004/0081412 A1* | 4/2004 | Cocchini et al. ............ 385/104 |
| 2007/0217744 A1* | 9/2007 | Debut et al. .................... 385/50 |

FOREIGN PATENT DOCUMENTS

| | | |
|---|---|---|
| EP | 1 174 396 A1 | 1/2002 |
| GB | 2 101 762 | 1/1983 |
| WO | WO-97/26221 | 7/1997 |

OTHER PUBLICATIONS

Barlow et al.; "Anisotropy in Spun Single-Mode Fibres"; Electronics Letters, vol. 18, No. 5, pp. 200-203, (1982).

Li et al.; "Effects of Lateral Load and External Twist on PMD of Spun and Unspun Fibers"; ECOC'99, pp. 62 and 63, (1991).

Wal et al.; "Polarization Mode Dispersion, Decorrelation, and Diffusion in Optical Fibers With Randomly Varying Birefringence"; Journal of Lightwave Technology, vol. 14, No. 2, pp. 148-157, (1996).

* cited by examiner

OPTICAL FIBER HAVING A LOW POLARIZATION MODE DISPERSION AND PROCESS AND APPARATUS FOR PRODUCING IT

CROSS REFERENCE TO RELATED APPLICATION

This application is a national phase application based on PCT/EP2003/010517, filed Sep. 22, 2003, the content of which is incorporated herein by reference.

BACKGROUND OF THE INVENTION

1. Field of the Invention

The present invention relates to a process for producing a low-polarization mode dispersion optical fiber.

2. Description of the Related Art

Optical signals transmitted through single-mode optical fibers comprise two orthogonal polarization modes (typically denoted TE and TM) that, in case of a fiber with a perfectly cylindrical core of uniform diameter, propagate at a common velocity. However, in real optical fibers the core cylindrical symmetry may be disrupted due to shape defects or non-uniform stresses. As a result, a phase difference can accumulate between the two modes, and the fiber is said to show "birefringence". In particular, the birefringence introduced by shape and stress asymmetry is known as "intrinsic linear birefringence".

The structural and geometrical irregularities of the optical fiber that give rise to birefringence typically originate from the preform itself and are modified during the process of drawing the fiber. This process is usually carried out by means of an apparatus known as a "drawing tower", starting from a glass preform. In practice, after the preform has been placed in a vertical position and heated to a temperature above the softening point within a suitable furnace, the molten material is drawn downwards at a controlled velocity in such a way as to produce a threadlike element that forms the optical fiber itself. In this process, asymmetrical stresses are typically applied to the fiber.

In a birefringent fiber, the two components of the fundamental mode, initially in phase with each other, come to be in phase again only after a certain length, commonly known as the "beat length". In other words, the beat length is the period of repetition of a certain state of polarization (on the assumption that the fiber maintains a constant birefringence over this length).

In the so-called "polarization-preserving fibers", asymmetry is deliberately introduced into the fiber to generate birefringence. However, in ordinary (i.e. non-polarization-preserving) fibers, birefringence is detrimental. In fact, when pulsed signals are transmitted into an optical fiber, the birefringence is a potential cause of pulse spreading, since the two polarization components excited by the pulses travel at different group velocities (i.e. become dispersed). This phenomenon, known as polarization mode dispersion (PMD), has been widely studied in recent years because of its importance in periodically amplified light guide systems.

Typically, the phenomenon of PMD leads to a limitation of the width of the signal transmission band and, consequently, a degradation of the performance of the optical fibers along which the aforesaid signals are transmitted. This phenomenon is therefore undesirable in systems of signal transmission along optical fibers, especially in those operating over long distances, in which it is necessary to minimize any form of attenuation or dispersion of the signals to guarantee high performances in transmission and reception.

U.K. patent application GB2101762A considers the effects on PMD of post-draw fiber twisting and observes that, although this twisting reduces the PMD resulting from intrinsic linear birefringence, it introduces torsional stresses that generate a substantial circular birefringence due to the photoelastic effect. Twisting a drawn fiber thus reduces the bandwidth limitation due to one effect whilst replacing it with another. The same patent application thus propose to spin the preform during drawing, so that twisting can be effected whilst keeping the fiber material substantially unstressed. Spinning is performed at a relatively high rate, so that its spatial repetition frequency, or spin pitch, is small compared to the beat length due to intrinsic birefringence; as a result, an optical fiber is formed wherein the contribution of birefringence due to form and stress asymmetry is greatly reduced. Such a fiber is termed "spun" fiber to distinguish it from a twisted fiber. Conveniently the preform is spun at a substantially constant rate, but it could even reverse in direction, oscillating from a right-handed to a left-handed twist.

Due to spinning, the fiber undergoes a rotation of its polarisation axes. As a result, when the optical pulses are transmitted into the optical fiber, they propagate alternately on the slow and fast birefringence axes, thus compensating the relative delay and reducing the pulse spreading. This is equivalent to have a local effective refractive index for the pulses equal to the mean refractive index on the two axes, the average being taken over the pulse length along the fiber.

Theoretical studies have been carried out to analyse the effects of spinning on birefringence. For example, the article of A. J. Barlow et al., "*Anisotropy in spun single-mode fibers*", Electronics Letters, 4 Mar. 1982, Vol. 18, No. 5, shows that the dominant process for the reduction of PMD in a spun fiber is the averaging of the local fiber anisotropy by the rapid procession of the axes of asymmetry along the fiber. A further theoretical contribution is provided by the article of M. J. Li, "*Effects of lateral load and external twist on PMD of spun and unspun fibers*", ECOC '99, 26-30 Sep. 1999, Nice, France, which proposes a novel model (based on the coupled mode theory) to analyse the effects of lateral loads and external twist on PMD of spun and unspun fibers.

Apart from theoretical considerations, several techniques have been developed to reduce the PMD of an optical fiber, which take advantage of the effects of spinning during drawing.

Similarly to U.K. patent application GB2101762A, U.S. Pat. No. 5,581,647 describes a method of fabricating a dispersion compensation optical fiber, wherein the fiber is drawn while the preform is rotated about its axis. Particular process conditions are herein described: the fiber shall be drawn at a speed between 50 and 1,000 m/min and at a tension between 2.4 and 13 kg/mm$^2$, and the preform rotated at a speed between 10 and 1.000 rpm.

International patent application WO 97/26221 observes that the reduction in PMD produced by spinning is proportional to the spin rate, that very high spin rates are generally required to deal with the asymmetries of typical fibers, e.g., spin rates greater than 5,000 rpm, and that spinning a preform at such rates is not a practical solution for commercial fiber production.

U.S. Pat. No. 4,504,300, relating to a technique for making an optical fiber having chiralic structure, addresses drawbacks related to preform rotation and proposes a new spinning technique, consisting in rotating the fiber instead of the preform. In particular, a device is disclosed comprising means disposed just below the preform for twisting the fiber during fiber drawing. The twisting means comprise a rotating hoop supporting three pulleys. The twisted fiber is coated by coating means, followed by cooling by fast-cooling means that facilitate freezing-in of the twist.

As observed in WO 97/26221, a drawback associated to this technique is connected to the high risk of damaging the fiber surface due to the fact that the latter gets in touch with the above-mentioned pulleys before being properly protected by a suitable coating film.

In order to overcome this drawback, U.S. Pat. No. 5,298,047 and U.S. Pat. No. 5,418,881 propose to arrange the device adapted to apply the torque to the fiber downstream of the coating station. In particular, in the techniques herein described, the torque is applied by alternately canting in clockwise and counterclockwise direction a fiber guiding roll having a rotation axis which extends perpendicularly to the drawing axis of the fiber.

US patent application N. 2001/0020374 observes that, although substantially achieving the object of reducing the PMD of the fiber, the use of a canting roll shows a series of problems (for example the need of limiting the canting frequency to avoid a relative sliding between fiber and roll) and is only suitable for the application of an alternate (i.e. bidirectional) spinning to the fiber. However, although a new device is proposed that overcomes the drawbacks of the canting-roll technique and allows both unidirectional and alternate spinning, alternate spinning is still considered as preferable since it prevents the presence of residual torsions on the fibers wound onto the collecting spool, thus making easier both the unwinding and wiring operations of the same.

The possible presence of unwanted elastic twist is also noticed in U.S. Pat. No. 5,298,047, in relation to the application of an intermittent torque to the fiber. Apart from stating that it is generally desirable to remove the elastic twist, for instance by appropriate respooling, the Authors of that patent consider as preferable to alternately impose a clockwise and a counteclockwise torque to the fiber to substantially prevent introduction of the elastic twist.

The Applicant observes that alternate spinning has several drawbacks not previously highlighted. Alternate spinning may for example cause a relatively low mechanical efficiency of the spinning device, due to the continuous accelerations and decelerations. Moreover, with respect to a unidirectional spin, an alternate spin requires a relatively high peak profile amplitude to compensate those positions of the profile where the rotation slows down to change direction and, therefore, to guarantee a sufficient average spin rate. Besides, the sites where the spin rate is zero are detrimental for the PMD because there is an increase of the effective birefringence seen by the pulse, and so a higher contribution for PMD.

The Applicant has therefore considered again the use of unidirectional spin, and tried to solve the problems associated thereto. The Applicant has verified that, to achieve an efficient PMD reduction, a technique making use of unidirectional spin must take into account the effects of spin and of the circular birefringence induced by elastic twist as well.

SUMMARY OF THE INVENTION

The Applicant has found that, by spinning the fiber unidirectionally during drawing, and then de-twisting the fiber in a direction opposite that of the elastic torsion caused by spinning so as to control the elastic torsion, in particular so as to have a controlled amount of residual torsion in the final fiber, the PMD can be reduced to very low values. Moreover, subsequent handling operations on the fiber, such as for cabling, are made easier.

For the purposes of the present invention, with "unidirectional spin" it is intended a spin that occurs on a same direction apart from possible local inversions, for example due to fiber slippage in the spinning device or in the traction device. Moreover, with "substantially constant spin rate" it is intended a spin rate that shows maximum variations of ±1 turns/m with respect to its average value. Typical lengths over which averaging of the spin rate occurs are of 10 m or greater, depending on the drawing tower or other equipment used in the drawing process.

The unidirectional spin may be substantially constant in module, but the method of the present invention may be applied as well if the unidirectional spin is variable in module. A variable unidirectional spin function may be obtained by superposing a constant spin function to an alternate spin function, such as a sinusoidal or a trapezoidal spin function. In this case the de-twist is applied to remove the average elastic twist or to obtain a predetermined not-null value thereof.

The twist can be applied to the fiber during drawing or in a subsequent rewinding (or respooling) operation. The Applicant has moreover found that, with the proposed technique, the lowest values of PMD are obtainable by applying a twist that exceeds that required to compensate the elastic torsion due to spinning, in particular a twist that causes the fiber to show a residual torsion (or twist) greater than 0 turns/m and lower than about 1.5 turns/m, preferably lower than about 1 turns/m.

Here and below, the terms "spin" and "twist" identify two different types of torsion of the fiber. "Spin" identifies a torsion that is frozen-in during drawing, being applied to a viscous portion of the fiber and kept as a structural modification of the fiber while cooling. Differently, "twist" identifies an elastic torsion of the fiber, which is present when a torque is applied to a portion of fiber whose ends are constrained against rotation. In other words, although both spin and twist alter the fiber in shape, so that parts previously in the same straight line are located in a spiral curve, a twisted fiber will rotate back to its original shape when its ends are released from the rotation constraint, while a spun fiber will keep this alteration as an intrinsic and permanent deformation.

In the following description, two twist contributions are identified: a first contribution is the undesired twist produced during spinning, which is due to the presence of a fiber rotation constraint downstream the point of spinning, and which tends to generate circular birefringence in the fiber; the second contribution is the twist expressly applied to the fiber to remove the detrimental effects of the first twist contribution, and will therefore also called "de-twist". The twist expressly applied has a direction opposite that of the undesired twist resulting from spinning. In the following, with "direction opposite to the direction of spin", referred to the direction of the applied twist, it will be intended the direction opposite to the direction of the twist resulting from spinning.

With "residual twist" it will be intended the twist present in the fiber at the end of the considered process, either of drawing or of respooling, taking into account the twist contributions herein above described. For example, the residual twist at the end of the drawing process will be that resulting from the undesired effect of spinning (first contribution) if de-twisting is performed at a subsequent stage, or that resulting from both the undesired effect of spinning and the expressly applied twist if de-twisting is performed during drawing. The residual twist will be considered as "positive" when it has a direction opposite that of the twist produced by spinning.

The Applicant has also discovered that unidirectionally spun fibers may have a statistical distribution of the Differential Group Delays (DGD) which does not obey a Maxwellian statistics, as universally predicted by the available literature. Instead, the statistical distribution of the DGDs may have a Gaussian-like distribution with the expectation value over standard deviation ratio much bigger than the 2.37 value typical of the Maxwell distribution. This means that the DGD values are less dispersed around their expectation value, thus reducing the stochastic indetermination of the Polarization Mode Dispersion value. The Applicant has verified that the above behaviour is valid in at least certain ranges of length of the fiber.

In a first aspect, the present invention thus relates to a process for producing a low-PMD optical fiber, comprising drawing a glass preform into an optical fiber; spinning the optical fiber unidirectionally about its axis during drawing, causing the optical fiber to undergo an elastic torsion; winding the optical fiber onto a reel; and further comprising twisting the spun optical fiber about its axis in a direction opposite the direction of said elastic torsion, for controlling said elastic torsion.

Advantageously, twisting the spun optical fiber comprises imparting a twist to the optical fiber that is greater in module than said elastic torsion, so as to provide the optical fiber with a residual torsion.

Preferably, twisting the spun optical fiber is performed at a substantially constant rate.

The residual torsion is preferably comprised in module between 0 and about 1.5 turns/m, more preferably comprised in module between 0.3 and 1 turns/m.

Spinning the optical fiber is preferably performed at a rate between about 1 and 8 turns/m.

Spinning the optical fiber may be performed at a substantially constant rate or at a variable rate. In this second case, spinning the optical fiber may be performed according to a spinning function obtained by superposing a constant function and a periodic function.

Twisting the optical fiber may be performed while winding the optical fiber onto the reel. Alternatively, the process may further comprise unwinding the optical fiber from said reel and rewinding the optical fiber onto a further reel, and twisting to the optical fiber may be performed while unwinding the optical fiber or while rewinding the optical fiber.

In a second aspect thereof, the present invention relates to an apparatus for producing a low-PMD optical fiber, comprising:
- a furnace for melting a lower portion of an optical preform;
- a traction device for pulling an optical fiber from the lower portion of the optical preform;
- a spinning device for imparting a unidirectional spin to the optical fiber about its axis as it is pulled, in such a way that the optical fiber undergoes an elastic torsion;
- a winding device for winding the optical fiber onto a reel;

and further comprises a twisting device for imparting to the spun optical fiber a twist about its axis in a direction opposite said elastic torsion.

The twisting device may be associated to the winding device.

Alternatively, the apparatus may further comprise an unwinding device for unwinding the optical fiber from the reel and the twisting device may be associated to the unwinding device.

The apparatus advantageously comprises at least a coating device for applying at least a protective coating to the optical fiber as it is pulled and the spinning device is preferably positioned between the at least a coating device and the traction device.

In a further aspect thereof, the present invention relates to an optical cable comprising at last an optical fiber having a unidirectional intrinsic spin and an elastic twist that is substantially null or opposite said spin and greater than zero in module. The intrinsic spin may be substantially constant or may be variable.

The elastic twist is preferably comprised, in module, between 0 and about 1.5 turns/m. More preferably, the elastic twist is comprised between about 0.3 and 1 turns/m.

The intrinsic spin is preferably comprised, in module, between about 1 and 8 turns/m.

In a further aspect thereof, the present invention relates to an optical fiber having unidirectional intrinsic spin and an elastic twist that is substantially null or opposite said spin and greater than zero in module. The intrinsic spin may be substantially constant or variable.

The elastic twist of the fiber is preferably comprised, in module, between 0 and about 1.5 turns/m, more preferably between about 0.3 and 1 turns/m, and the intrinsic spin is preferably comprised in module between about 1 and 8 turns/m.

BRIEF DESCRIPTION OF THE DRAWINGS

The invention is described in detail below with reference to the attached figures, in which a non-restrictive example of application is shown. In particular.

DETAILED DESCRIPTION OF THE INVENTION

Figure 1:
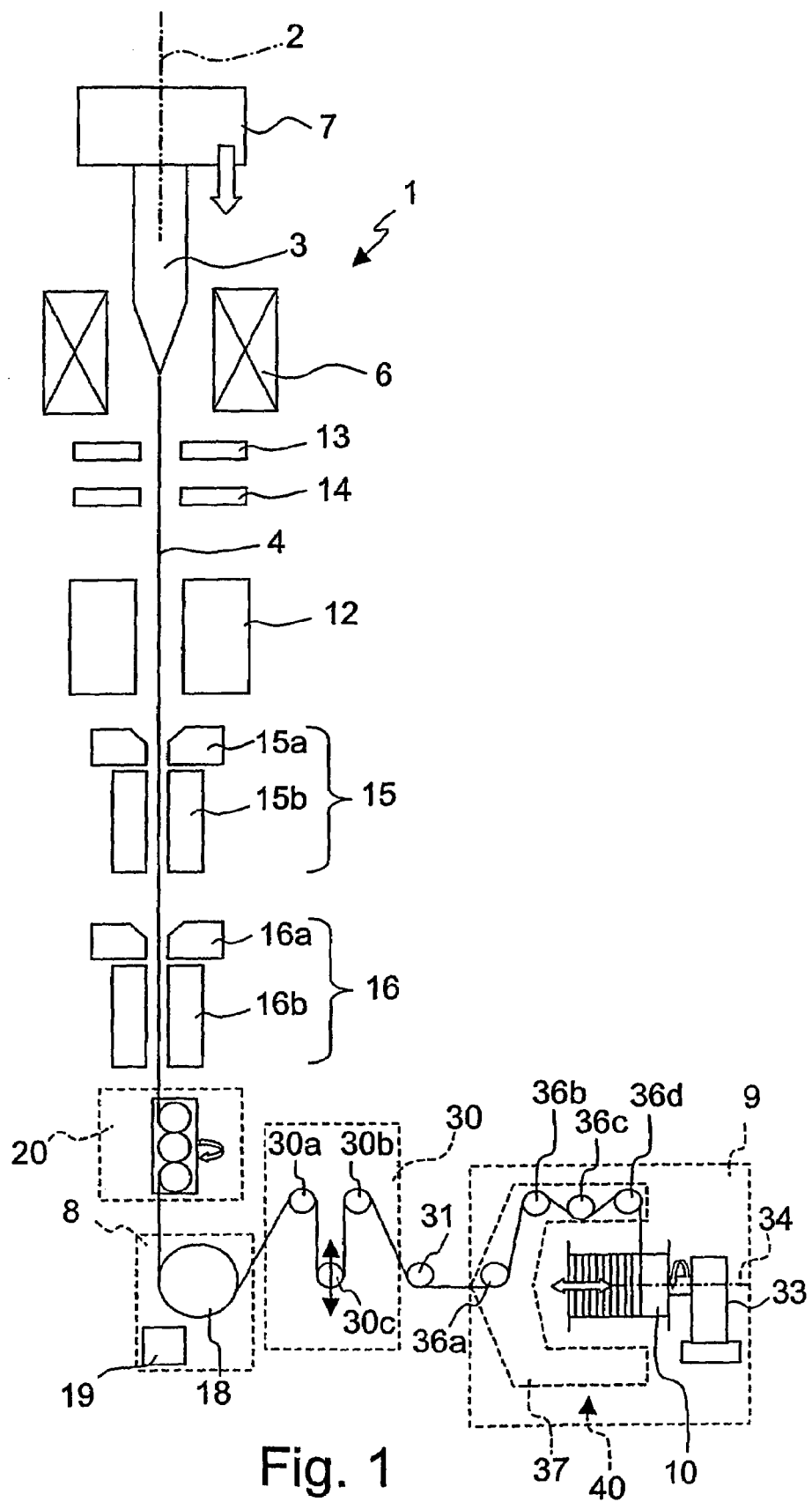
FIG. 1 shows a drawing tower according to the present invention.

With reference to FIG. 1, a drawing tower 1 comprises a plurality of devices that are substantially aligned in a vertical drawing axis 2 (whence the term "tower"). The choice of a vertical direction in order to perform the main steps of the drawing process arises from the need to exploit the gravitational force so as to obtain, from a glass preform 3, molten material from which an optical fiber 4 can be drawn.

In detail, the tower 1 comprises a furnace 6 for performing a controlled melting of a lower portion of the preform 3 (also known as preform neckdown), a feeding device 7 for supporting the preform 3 and feeding it into the furnace 6 from the above, a traction device 8 (at a lower end of the tower) for pulling the fiber 4 from the preform 3 and a winding device 9 for storing the fiber 4 onto a reel 10.

The furnace 6 may be of any type designed to produce a controlled melting of a preform. Examples of furnaces that can be used in the tower 1 are described in U.S. Pat. No. 4,969,941 and U.S. Pat. No. 5,114,338.

Preferably, a cooling device 12, for example of a type having a cooling cavity designed to be passed through by a flow of cooling gas, is situated underneath the furnace 6 for cooling the fiber 4 leaving it. The cooling device 12 is arranged coaxial to axis 2, so that the fiber 4 leaving the furnace 6 can pass it through.

Tower 1 may also be provided with a tension-monitoring device 13 (for example of the type described in U.S. Pat. No. 5,316,562) and a diameter sensor 14 of a known type, preferably positioned between the furnace 6 and the cooling device 12, for measuring the tension and the diameter of the fiber 4, respectively.

Preferably, tower 4 further comprises a first and a second coating device 15, 16 of a known type, positioned underneath the cooling device 12 in the vertical drawing direction and designed to deposit onto the fiber 4, as it passes through, a first protective coating and, respectively, a second protective coating. Each coating device 15, 16 comprises, in particular, a respective application unit 15*a*, 16*a* which is designed to apply onto fiber 4 a predefined quantity of resin, and a respective curing unit 15*b*, 16*b*, for example a UV-lamp oven, for curing the resin, thus providing a stable coating.

The traction device 8 may be of the single pulley or double pulley type. In the illustrated embodiment, the traction device 8 comprises a single motor-driven pulley (or "capstan") 18 that is designed to draw the fiber 4, already coated, in the vertical drawing direction. The traction device 8 may be provided with an angular velocity sensor 19 that is designed to generate a signal indicating the angular velocity of the pulley 18 during its operation. The speed of rotation of the pulley 18 and, therefore, the drawing speed of the fiber 4, may be varied during the process, for example as a response to a diameter variation detected by detector 14.

Tower 4 further comprises a spinning device 20, positioned between coating devices 15, 16 and traction device 8, for imparting a spin to the fiber 4 about its axis during drawing. For the purposes of the present invention, the term "spin" denotes the ratio (disregarding a constant multiplication factor) between the angular velocity of rotation dθ/dt of the optical fiber (where θ is the angle of rotation of the optical fiber measured with respect to a fixed reference point) and the velocity of drawing. The spin defined in this way is typically measured in turns/m.

Figure 2:
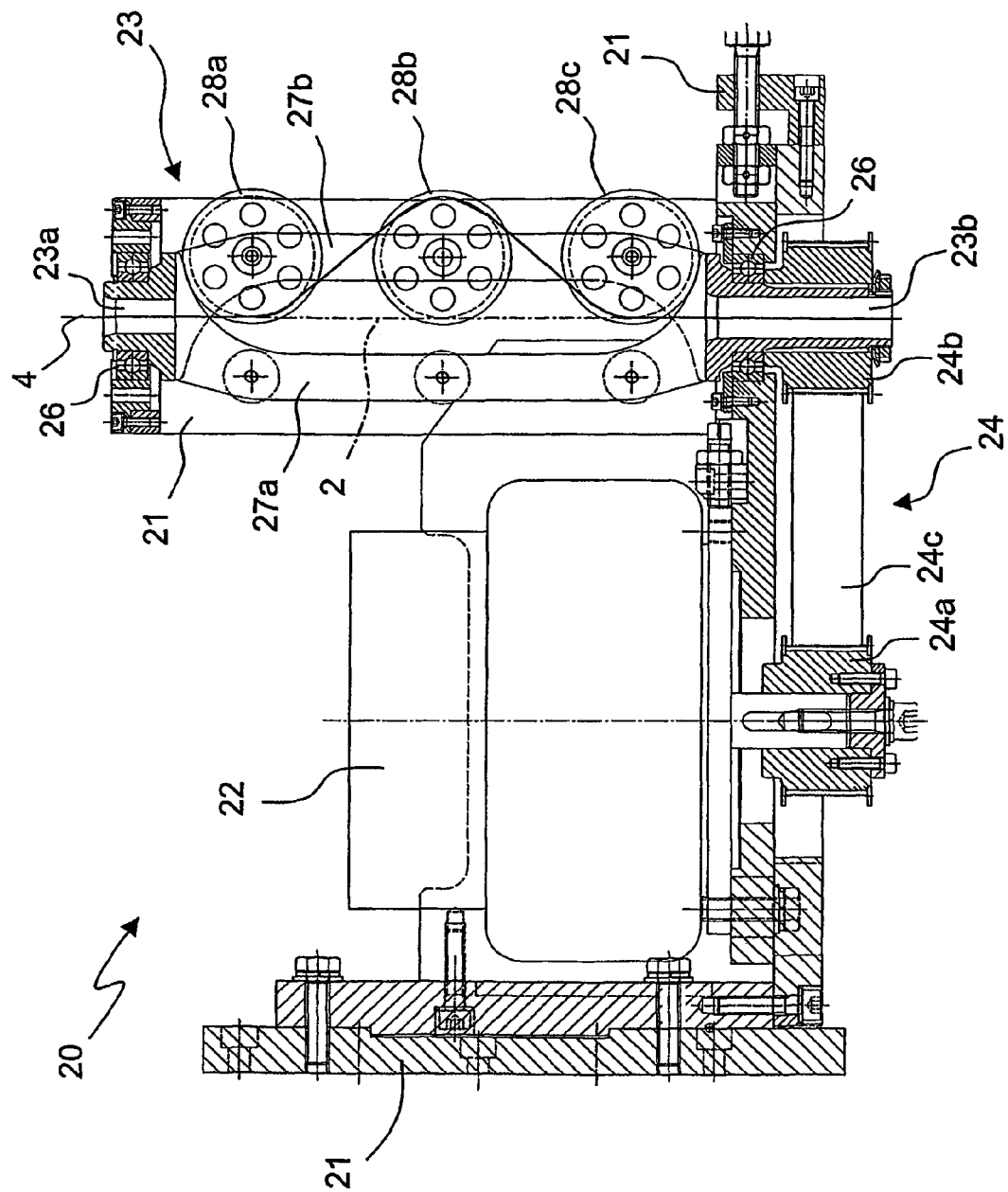
FIG. 2 illustrates a spinning device suitable to be used in the drawing tower of FIG. 1.

In one possible embodiment illustrated in FIG. 2, the spinning device 20 comprises a fixed support frame 21, a DC motor 22 held by the frame 21 and a rotating member 23 held by the frame 21 and coupled to the motor 22 through a belt transmission 24. The belt transmission comprises a first driving pulley 24*a* rigidly coupled to motor 22, a second driving pulley 24*b* rigidly coupled to the rotating member 23 and a belt 24*c* connecting the first driving pulley 24*a* to the second driving pulley 24*b*.

The rotating member 23 has a rotation axis corresponding to axis 2, i.e. to the axis of motion of the fiber 4 when entering and leaving the device 20. The rotating member 23 comprises a first and a second sleeve-like end portion 23*a*, 23*b* (respectively upper and lower), which are rotatably coupled to the support frame 21 by means of respective bearings 26 and which allows passage of the fiber there through. The second end portion 23*b* is coupled with the second driving pulley 24*b*.

The rotating member 23 comprises two arms 27*a*, 27*b*, extending from the first end portion 23*a* to the second end portion 23*b*. Arms 27*a*, 27*b* are substantially C-shaped, with a main straight central region parallel to axis 2, and are arranged symmetrically to each other with respect to axis 2. One of the two arms (the one indicated with 27*b* in the drawing) carries a first, a second, and a third idle-mounted rotating pulley 28*a*, 28*b*, 28*c* (from up to down in the drawing), substantially aligned in a direction parallel to axis 2. The three pulleys 28*a*, 28*b*, 28*c* have the corresponding axes perpendicular to axis 2 and are dimensioned so that the corresponding guiding grooves are substantially tangent to axis 2.

With reference again to FIG. 1, tower 4 may also comprise a tension-control device 30, commonly known as "dancer", for adjusting the tension of the fiber 4 downstream the traction device 8. Tension-control device 30 is designed to counterbalance any variations in tension of the fiber 4 between pulley 18 and winding device 9. Tension-control device 30 may comprise, for example, a first and a second pulley 30*a*, 30*b* that are mounted idle and in a fixed position, and a third pulley 30*c* which is free to move vertically, under the action of its own weight and the tension of the fiber 4. In practice, pulley 30*c* is raised if there is an undesirable increase in the tension of the fiber 4 and is lowered if there is an undesirable decrease in the tension of the fiber 4, so as to keep the said tension substantially constant. The pulley 30*c* may be provided with a vertical position sensor (not shown) that is designed to generate a signal indicating the vertical position of the pulley 30*c* and therefore indicating the tension of the fiber 4.

One or more pulleys 31 (or guiding members of other types) are advantageously provided for guided the fiber 4 from the tension-control device 30 to the winding device 9.

Winding device 9 comprises, in the illustrated embodiment, a first, a second, a third and a fourth guiding pulley 36*a*, 36*b*, 36*c*, 36*d*, held by a support member 37, for guiding the fiber 4 onto the reel 10. Winding device 9 further comprises a motorized device 33 to set the reel 10 into rotation about its axis, indicated with 34. Motorized device 33 may also be suitable for reciprocating the reel 10 along axis 34, so as to allow helix winding of the fiber 4 thereon during drawing. Alternatively, the reel 10 may be axially fixed and the support member 37 (together with pulleys 36*a*, 36*b*, 36*c*, 36*d*) may be mounted on a motorized slide (not shown) designed to reciprocate along an axis parallel to the reel axis 34.

According to the present invention, a twist apparatus 40 is advantageously used for de-twisting the fiber, i.e. for removing the elastic torsion stored in the fiber 4 when spun. The twist apparatus 40 may be used at the drawing stage, in particular to de-twist the fiber 4 during winding thereof, or may be used at a subsequent stage, for example during unwinding of the fiber 4 for respooling on a bobbin suitable for shipment, as will be described in the following.

Figure 3:
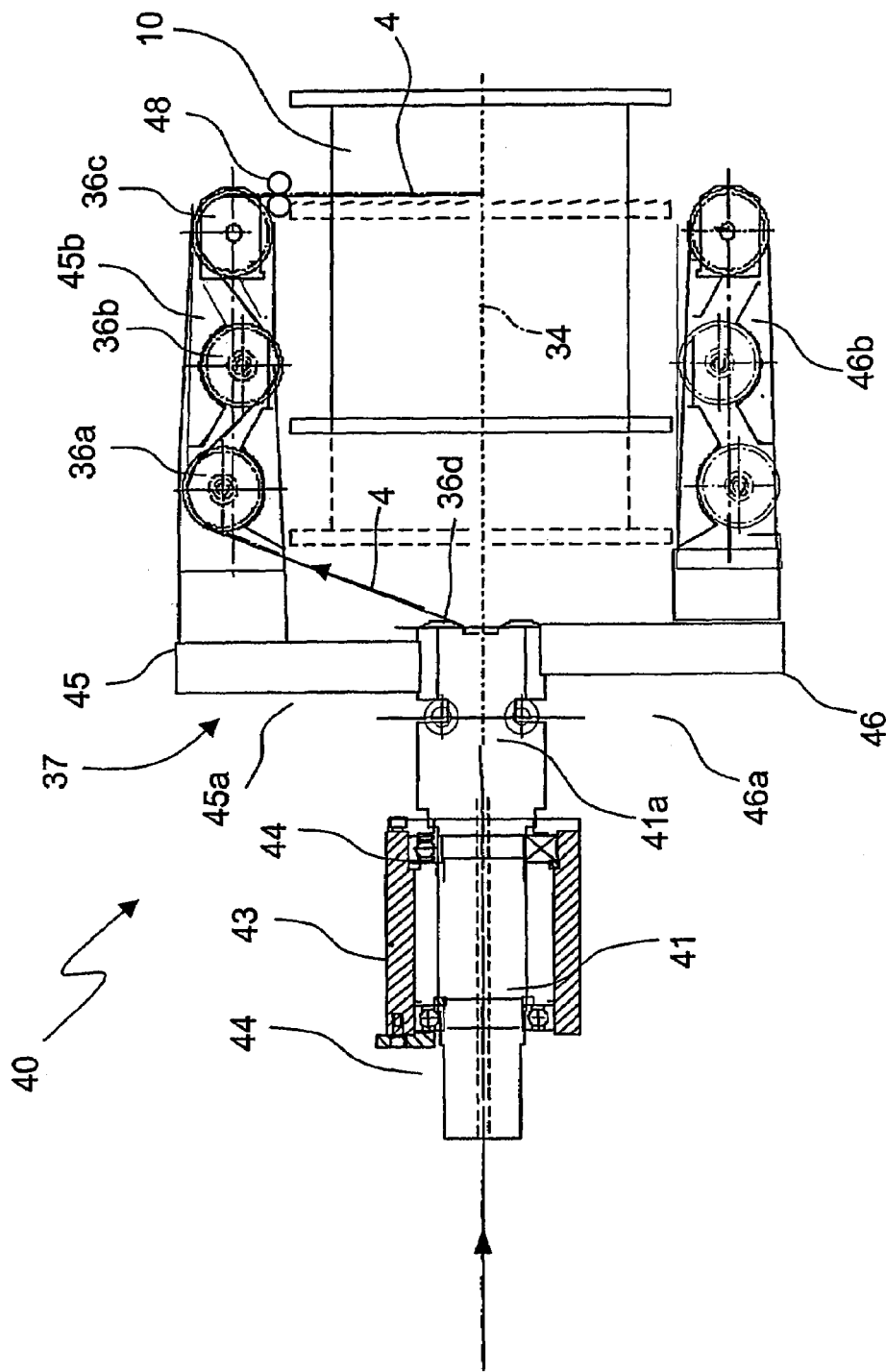
FIG. 3 shows a twist apparatus suitable to be used in the drawing tower of FIG. 1.

Twist apparatus 40 may advantageously be integrated in the winding device 9 of the drawing tower 1. In particular, support member 37 and pulleys 36*a*, 36*b*, 36*c*, 36*d* may form part of twist apparatus 40. With reference to FIG. 3, which illustrates one possible embodiment of twist apparatus 40, the support member 37 is a rotating member having the shape of a two-prongs fork and comprising a hollow spindle 41 and two arms 45, 46 extending from one end 41*a* of the hollow spindle 41. Spindle 41 is held coaxial to axis 34 by a fixed frame 43 and is rotatably mounted thereon through bearings 44. Spindle 41 is driven by a D.C. motor (not shown) through a belt transmission (not shown). In use, spindle 41 is designed to be passed through by the fiber 4 along axis 34.

First and second arms 45, 46 are symmetrical to each other with respect to axis 34 and have respective first portions 45*a*, 46*a* rigidly connected to spindle 41 and extending away from axis 34 opposite to each other, and respective second portions 45*b*, 46*b* parallel to axis 34. The first portions 45*a*, 46*a* have a radial extension greater than the radius of the reel 10 and the second portions 45*b*, 46*b* have a length corresponding substantially to the length of the reel 10. The reel 10 is located between the second portions 45*b*, 46*b* of arms 45, 46.

The first pulley 36*a* is positioned at the end of spindle 41 facing the reel 10, and is designed to deviate the fiber 4 to the first arm 45. The second, third and fourth pulleys 36b, 36c, 36d are positioned along the second portion 45b of the first arm 45 and define a wavy path for the fiber 4 before it is fed to the reel 10. The function of the third pulley 36c (which is intermediate between the second pulley 36b and the fourth pulley 36d) is to avoid the fiber from slipping from pulleys 36b and 36d, and may also be omitted. The second arm 46 has only a balancing function and may carry three pulleys identical to pulleys 36b, 36c, 36d, to have the same distribution of weights of the first arm 45.

While the first, second and third pulleys 36a, 36b, 36c preferably have the respective axis parallel to each other and perpendicular to axis 34, the fourth pulley 36d is preferably tilted about an axis parallel to axis 34, of such an angle that it lies on a plane that is tangent to the fiber bobbin when the reel 10 is half filled.

The twist apparatus 40 preferably comprises a fiber position sensor 48 (for example model Keyence FS-V11P FU-35FA) positioned between the fourth pulley 36d and the reel 10, to provide a control signal for the alternate axial motion of the reel 10 (FIG. 3 shows, for example, two different positions of reel 10) or of the support member 37. In fact, as previously stated, a relative alternate motion shall be provided between reel 10 and support member 37 to allow helix winding of the fiber 4.

The drawing tower 1 may further comprise a control unit (not shown), electrically connected to all the devices of tower 1 to be controlled from the outside and to all the sensors and the detectors present along the tower 1.

The drawing tower 1 operates as follows.

The supporting device 7 feeds the preform 3 to the furnace, where a lower portion thereof (the neckdown) is melted. The fiber 4 drawn from the neckdown is pulled down from the traction device 8 and wound onto the reel 10 by the winding device 9. Between capstan 18 and reel 10, the tension-control device 30 regulates the tension of fiber 4.

As the fiber 4 is drawn, sensors 13 and 14 monitor its tension and diameter. Such monitoring can be used to control the drawing process, for example by operating on the traction speed. When exiting the furnace 6, the fiber 4 is cooled by the cooling device 12 and is coated with two protective layers by coating devices 15, 16.

The coated fiber 4 is then subjected to a unidirectional and substantially constant spin by spinning device 20. This is obtained by setting into rotation the rotating member 23 about axis 2 at a constant speed. Each turn of the rotating member corresponds to one turn of the fiber 4 about its axis.

The spin rate is selected in such a way that the effects of the imperfections and irregularities of the fiber 4 are rendered substantially uniform in a length of the fiber 4 equal to at least the shortest typical beat length. As a result, when signals are transmitted into the fiber, there is an exchange of power between the fundamental propagation modes and, therefore, a reduction of the PMD. Thus, it is possible to reduce significantly the negative effects caused by the asymmetric stress conditions and by the imperfections of shape intrinsically present in the fiber 4.

The Applicant has observed that the higher is the spin rate the better are the performances of the fiber in terms of PMD. However, the higher is the spin rate the higher is the elastic twist to be removed. The Applicant has verified that a spin rate between 1 and 8 turns/m allows reducing the PMD at acceptable values and at the same time introduces an amount of elastic twist that can be efficiently removed by the technique here described.

When spun, the fiber 4 transmits a corresponding torque upstream and downstream. Upstream, the torque is transmitted to the preform neckdown, where the plastic deformation of the melted glass "absorbs" the torque and "transforms" it into an intrinsic orientation of the birefringence axes of the fiber 4. This intrinsic torsion is frozen into the fiber 4 as the fiber cools. Downstream, in the absence of any countermeasure, the torque would be transmitted as far as the reel 10, where the fiber 4, once wound, would keep a residual elastic twist. This elastic twist would introduce, if not controlled, an undesired circular birefringence in the fiber 4.

In order to control the residual twist in the wound fiber 4, the fiber 4 is de-twisted by the twist apparatus 40. In practice, the rotating support member 37 is made to rotate about axis 34, in a direction opposite to that of spinning (more precisely, as previously stated, in a direction opposite that of the elastic twist generated by spinning). Each turn of the support member 37 about axis 34 corresponds to one turn of the fiber 4 about its axis. The torque transmitted along the fiber 4 downstream the spinning device 20 is then at least reduced by twist apparatus 40 before the fiber is wound onto reel 10.

In detail, the fiber 4, after passing through the spindle 41, is deviated by the first pulley 36a toward the first arm 45, is herein conveyed along the second portion 45b with the required tension by the second and third pulleys 36b, 36c, and is finally fed to reel 10 by the fourth pulley 36d, in a direction substantially perpendicular to axis 34. While being rotated about axis 34, reel 10 is also reciprocated along axis 34 to allow helical winding of the fiber 4.

The signal of sensor 48 is used to control the speed of the alternate motion of the reel 10, so that the fiber 4 is made always to pass in a predetermined position of the sensor 48.

The Applicant has found that the PMD of the fiber 4 can be reduced to a minimum by imparting to the fiber, after it has been spun, a twist that not only removes the elastic twist generated by spinning but also introduces a positive residual twist, i.e. a twist in the opposite direction. The Applicant has verified that a positive residual twist between 0 and 1.5 turns/m, preferably between 0.3 and 1 turns/m, allows reducing the PMD of spun fibers in a wide range of spin rates, at least up to 8 turns/m.

As previously stated, fiber de-twisting may be performed at a stage subsequent to drawing, and may be associated to the operation of unwinding of the fiber 4 from reel 10. For example, de-twisting may be performed during re-spooling of the fiber 4 onto a shipping spool to be shipped to a customer or during screening operations. Screening is a test operation performed on an optical fiber to check his strength, which comprises the application of a predetermined longitudinal tension to the fiber 4 while it runs in a predetermined path, usually defined by pulleys.

Figure 4:
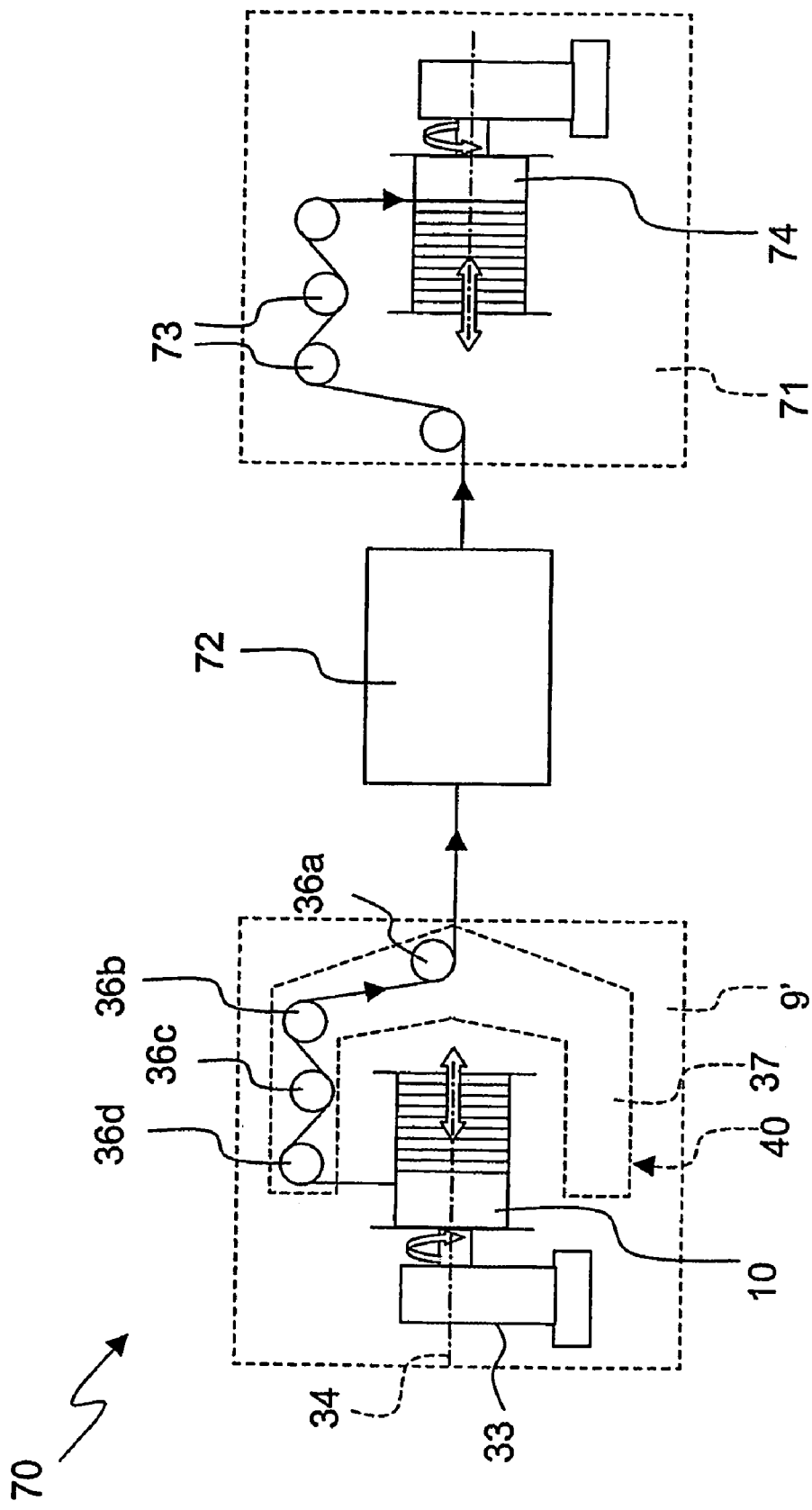
FIG. 4 illustrates a re-spooling apparatus.

As shown in FIG. 4, twist apparatus 40 may for example be used with the fiber 4 moving in the opposite direction, to perform fiber de-twisting while it is unwound. In particular, FIG. 4 illustrates a re-spooling assembly 70 comprising an unwinding device 9' for unwinding the fiber 4 from reel 10 and a further winding device 71, including guiding pulleys 73, for re-winding the fiber 4 onto a different reel 74. Unwinding device 9' substantially corresponds to winding device 9 but operates in the opposite direction to unwind the fiber 4. In this case, the twist apparatus 40 is integrated in the unwinding device 9' for de-twisting the fiber 4 as it is unwound. The re-spooling assembly 70 may also comprise a screening device 72, for example of the type described in U.S. Pat. No. 5,076,104.

Figure 5:
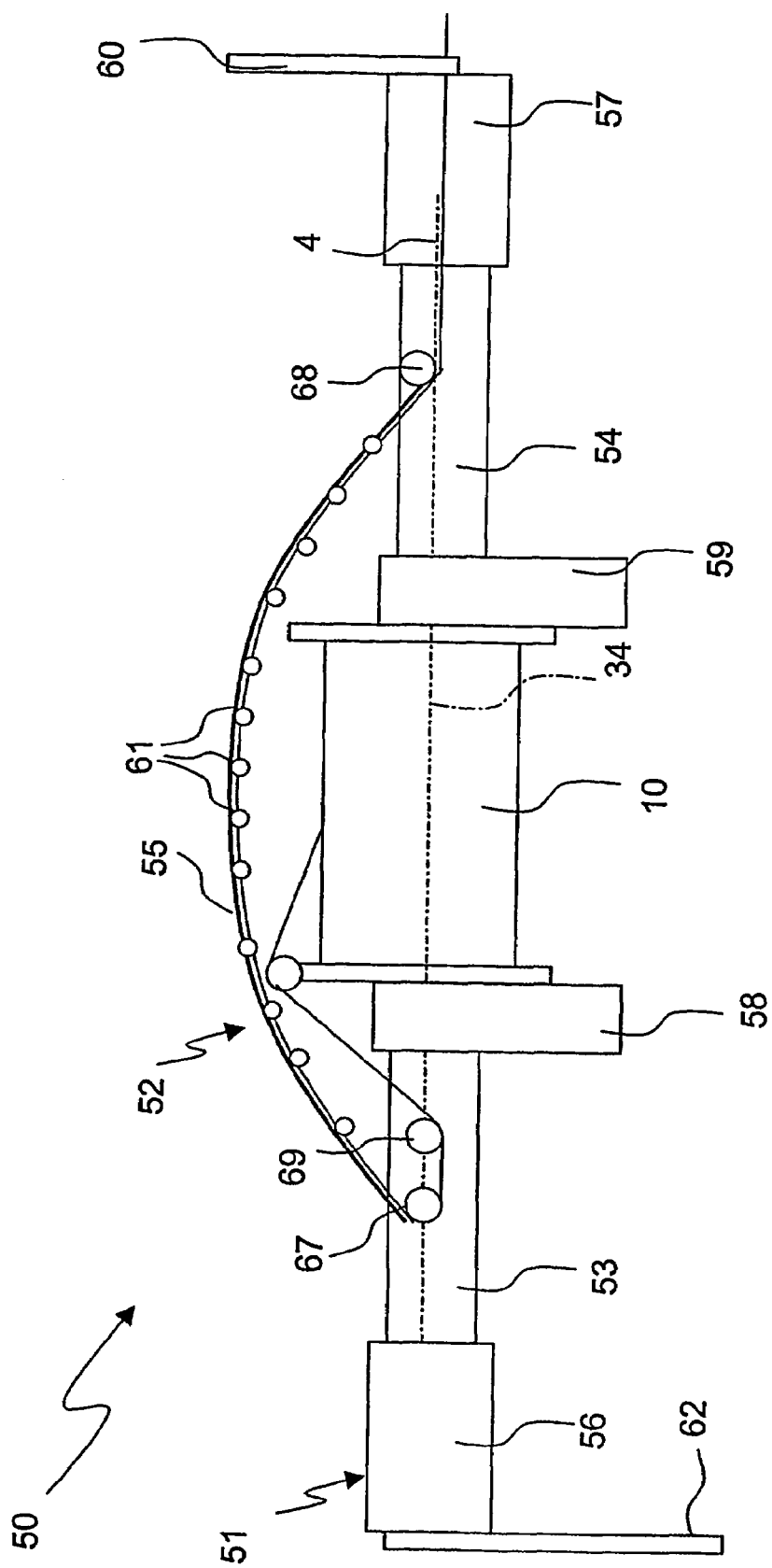
FIG. 5 shows a twist apparatus to be used in the drawing tower of FIG. 1 in alternative to the apparatus of FIG. 3.

FIG. 5 shows a different embodiment of the twist apparatus, here indicated with 50. Twist apparatus 50 comprises a fixed frame 51 supporting reel 10 along axis 34 and a rotating member 52 for twisting the fiber 4 as it is wound onto reel 10 or unwound from reel 10.

The rotating member 52 comprises a first and a second spindle 53, 54, supported by frame 51 coaxial to axis 34, and a flexible arch member 55 connecting the two spindles 53, 54 over reel 10, for passage of the fiber 4.

The fixed frame 51 comprises two external support members 56, 57 and two internal support members 58, 59 substantially aligned along axis 34. External support members 56, 57 are cylindrical and member 57 has an internal passage for the fiber 4, along axis 34. Reel 10 is positioned between the internal support members 58, 59 and is supported thereby. Reel 10 is connected to a motor (not shown) through a belt transmission 60.

Spindles 53, 54 are opposite to each other with respect to reel 10 and are connected to a same motor (different from that of reel 10 and not shown) through respective belt transmissions 62 (only one of which is illustrated), so that they can be rotated at a same speed. Each of the spindles 53, 54 is positioned between a corresponding external support member 56, 57 and a corresponding internal support member 58, 59. The first spindle 53 carries internally a pulley 67 tangent to axis 34 that allows passage of the fiber 4 between arch member 55 and a further pulley 69 tangent to axis 34 carried by the internal support member 58. The second spindle 54 carries internally a further pulley 68 tangent to axis 34 allowing passage of the fiber 4 between external support member 57 and arch member 55. One or more further pulleys are provided for guiding the fiber to or from reel 10.

The flexible arch member 55 is preferably made of carbonium and forms a bridge over reel 10 for passage of the fiber 4 between spindles 53, 54. Arch member 55 may be provided with equidistant guiding U-bolts 61, preferably made of ceramic and suitable to guide the fiber 4 along the arch member 55. Alternatively, the arch member 55 may be provided with a guiding tube (not shown), which offers the advantage of an easier set-up before process start, allowing blowing of the fiber 4 from one end to the other of the arch member 55.

Apparatus 50 is herein below described when operating for winding the fiber onto the reel 10. As apparatus 40, apparatus 50 may operate in the opposite direction to unwind the fiber 4 from the reel 10, for example in the re-spooling assembly 70 of FIG. 4.

Fiber 4 is received through member 57 and a first portion of the second spindle 54, where it is deviated by pulley 68 to arch member 55; it runs over the entire arch member 55 and enters the first spindle 53, where it is further deviated by pulley 67 towards internal support member 58 along axis 34; then it is further deviated by pulley 69 and finally fed to reel 10.

The amount of twist to be applied to the optical fiber 4 for obtaining the desired amount of residual twist may be determined according to the following technique. In a first step, a test fiber section only subjected to spin is drawn. This test fiber section can be obtained, for example, by operating the drawing tower 1 of FIG. 1 with the twist apparatus 40 off (i.e. with the rotating member 37 in a staying condition) for a predetermined time. Then, the residual twist accumulated in the test fiber section wound on the reel 10 is measured in the following way.

The reel 10 is hanged on a support located at a predetermined is height, for example at 2 m above ground. A corresponding length of fiber is unwound from the reel 10, keeping it under a moderate tension. The upper end of the unwound section is secured to the reel surface, while the free end is marked, for example with a small piece of tape (having a negligible weight) and it is let free to rotate. The measurement resolution depends on the length of unwound fiber. For a fiber length of 2 m, the number of turns can be measured with a resolution of about ¼ turns over 2 m, so that a resolution of about 0.125 turns/m can be obtained. If a higher resolution is required, a longer fiber can be used.

The Applicant has observed that the presence of the fiber coating shall be taken into consideration for an accurate measurement of the residual twist due to spinning, since a residual twist is also accumulated in the fiber under the coating. Accordingly, after the residual twist of the coated fiber has been measured in the way previously described, the free end of the coated fiber is blocked and the coating is completely removed (using a conventional Miller stripper). The fiber is then let again free to rotate, and the additional rotation of the fiber is measured with the same resolution as above.

The operation is repeated over consecutive fiber sections of predetermined length, for example every 2 m, to reach a predetermined total measured length, for example between 20 and 60 m. The mean value is used to label the torsion value of the fiber.

After the residual twist due to spinning has been measured, the fiber drawing may be continued with the twist apparatus 40 turned on, suitably set to obtain the desired residual twist.

It is thus possible to obtain an optical fiber having a unidirectional intrinsic spin and an elastic twist equal to zero in module or opposite said spin and greater than zero in module.

The unidirectional intrinsic spin may be substantially constant or variable. In this second case, the spin function is preferably obtained by superposing a substantially constant function and a periodic function, and the twist is applied so as to vary the average value of the residual twist to the desired value. The elastic twist applied to the fiber is preferably comprised in module between 0 and about 1.5 turns/m, more preferably between about 0.3 and 1 turns/m.

Figure 6:
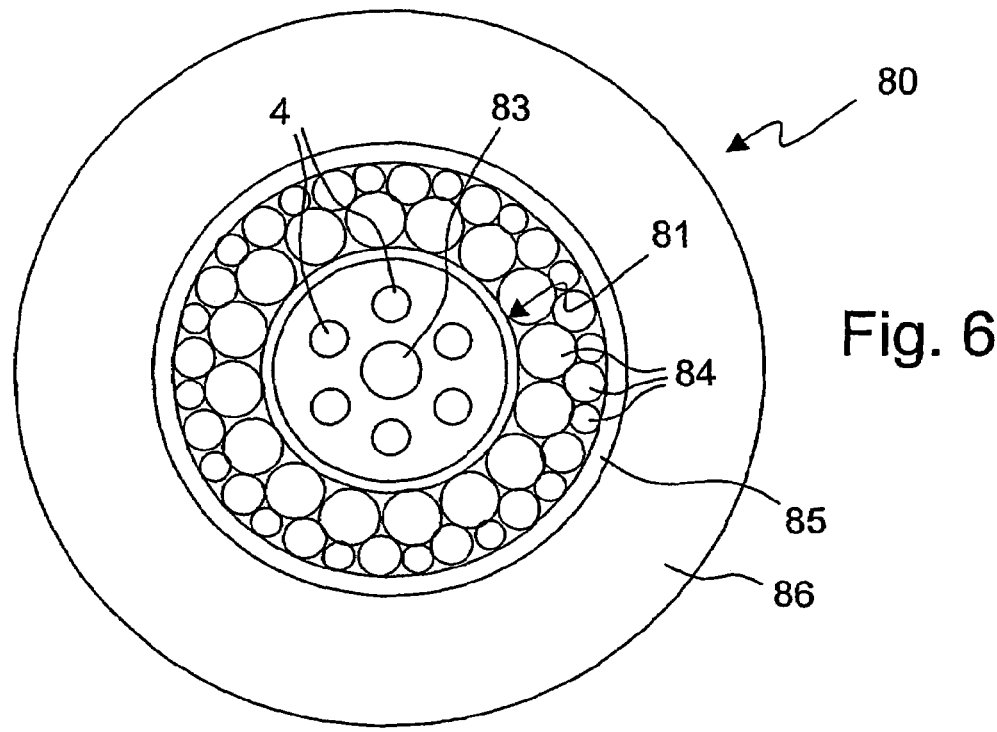
FIG. 6 shows an optical cable containing optical fibers produced according to the method of the present invention.

An optical fiber as obtainable by the manufacturing method of the present invention may be cabled for use in communication systems. With reference to FIG. 6, an optical cable 80 for such an application typically comprises an optical core 81 containing a plurality of optical fibers 4. The optical core 81 may be of the "tight" type (as the one illustrated), wherein the optical fibers 4 are embedded into a polymeric matrix disposed around a strength member 83, or of the "loose" type, wherein the fibers 4 are loosely housed within a single buffer tube centrally disposed within said cable or within a plurality of buffer tubes stranded around a central strength member. Around the optical core 81, the optical cable 80 is provided with reinforcing elements 84 and protective sheaths 85, 86.

In "tight" type cabling, the contact between the fiber and the polymeric matrix prevents the twist imparted to the fibers to be released. In "loose" type cabling, the twist imparted on the fiber is not released, for typical cable lengths, due to friction between the fiber and the buffer tube, possibly enhanced by the presence of a jelly filler.

EXAMPLES

In a first experiment, the Applicant has compared the PMD of a unspun fiber with the PMD of a fiber spun at 7.3 turns/m. Two corresponding fibers of 10 km length, consistent with the ITU-T G.652 specification, were drawn from the same preform (obtained with the OVD deposition technique). The experiment was carried out at a typical drawing speed.

After measuring the residual twist of the spun fiber with the above-described technique, the fiber was cut in 1-km spans associated with different residual twists. In practice, a first 1-km span was wound on a smaller bobbin with a predetermined detwist, then the fiber was cut and a second 1-km span was wound on another smaller bobbin with a different detwist, and so on. The PMD of the different spans was then measured.

Figure 7A:
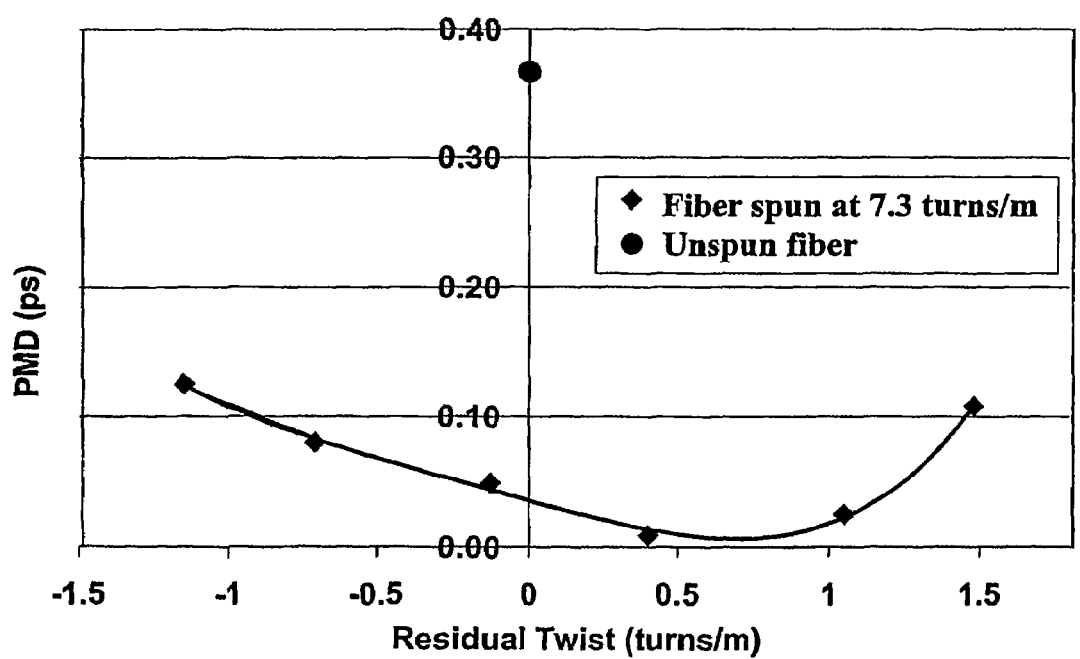
FIGS. 7-10 show the results of experimental tests and simulations.

FIG. 7a shows the PMD of six 1-km spans of spun fiber having different residual twists, compared to the PMD of the unspun fiber. The Figure shows the improvement obtainable in terms of PMD by twisting the fiber and further shows the detected correlation between PMD and residual twist for the spun fiber. It can be appreciated that the PMD reaches a minimum for a positive residual twist, i.e. for a residual twist obtained by not only completely removing the elastic twist produced by spinning the fiber, but also by adding a further twist contribution in the same direction. The minimum of the PMD, which is approximately 0.01 ps, is reached for a residual twist of between 0.3 and 1 turns/m.

The well-known JME technique was used to measure the PMD. The fiber was previously laid down on the floor on a path of about 30 m, to prevent the stress and twist which would be present on a wound bobbin and which would influence the PMD measurements. The wavelength scan was set between 1520 and 1630 nm. All the reported PMD values are the average of the delay distribution. It was verified that the sensitivity of the technique was about 0.002 ps.

In a second experiment, the comparison has been made between an unspun fiber and a fiber spun at 3.6 turns/m, consistent with the ITU-T G.652 specification and drawn from a same preform, different from that of the first experiment but still produced with the OVD method. Again, fibers of 10 km length were drawn, and the spun fiber was cut into spans of 1 km length having different residual twists.

Figure 7B:
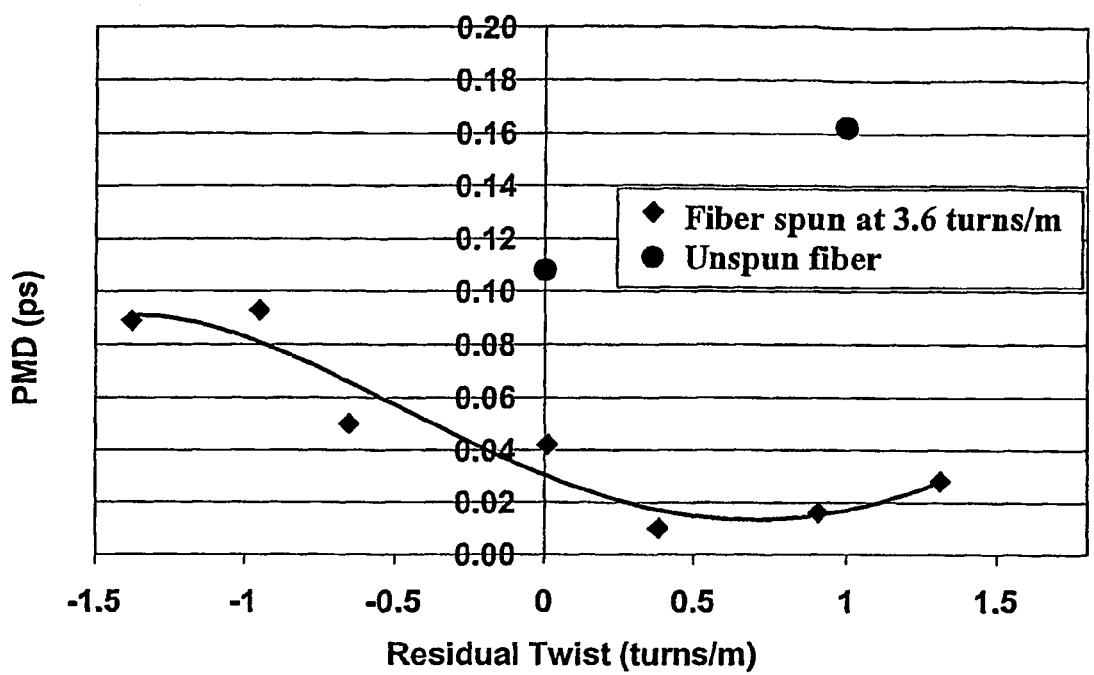

The results of this experiment, illustrated in FIG. 7b, confirm those of the first experiment, although the PMD of the unspun fiber is substantially different in the two cases (which is due, according to the Applicant, to the different optical characteristics of the two preforms). Moreover, as shown in FIG. 7b, while a positive residual twist improves the fiber performances in terms of PMD, a positive unidirectional twist of 1 turns/m imparted to the unspun fiber increases the fiber PMD. This different behaviour shows that the PMD reduction of a spun fiber obtained by subjecting the fiber to a positive residual twist was not predictable on the basis of the typical behaviour of unspun fibers.

In a third experiment, the performances of three further spun fibers, obtained from a same preform different from that of the first and second experiment (but still obtained by the OVD technique), have been compared. Again, fiber spans of 10 km length each (drawn from the same perform) and consistent with the ITU-T G.652 specification were drawn, the spun fibers being then cut into spans of 1 km length associated with different residual twists. The spinning rate was of 4.20 turns/m, 3.03 turns/m and 0.64 turns/m, respectively.

Figure 7C:
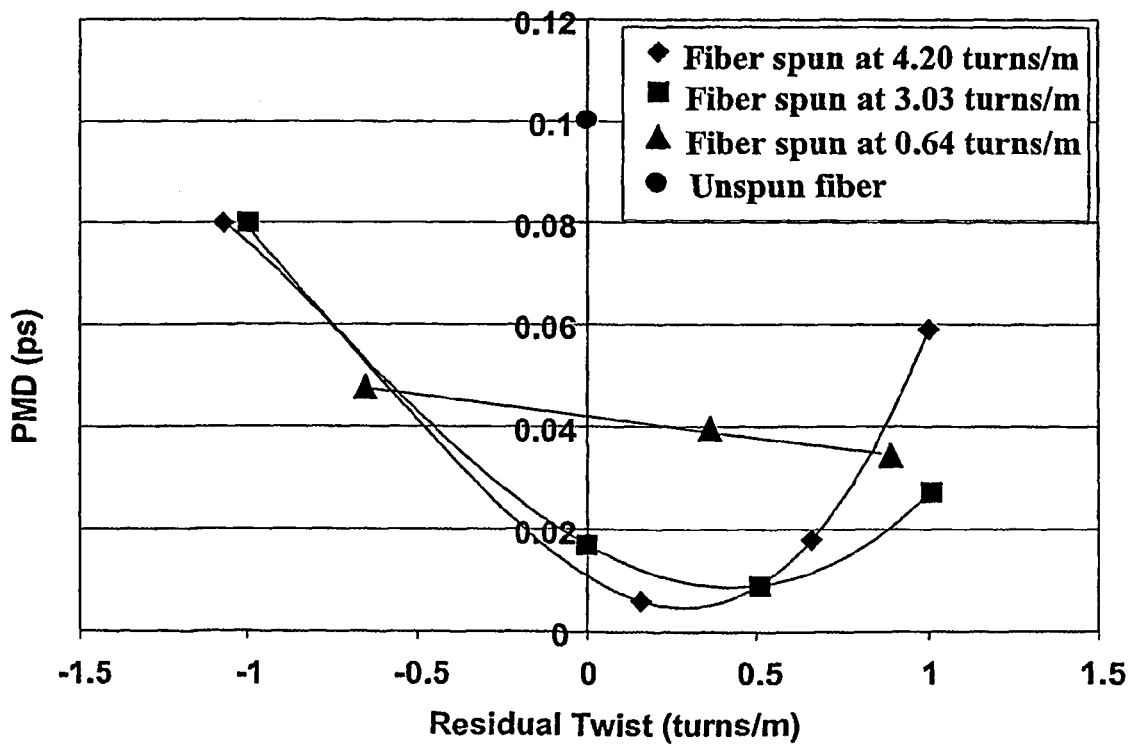

FIG. 7c shows the results of this test. It can be appreciated that the higher is the spin rate, the lower is the PMD achievable. In the considered test, the minimum value of PMD is obtained with the spin rate of 4.20 turns/m; in particular, a PMD of 0.006 ps has been measured for a residual twist of 0.16 turns/m. However, it can also be observed that high values of the spin rate are typically associated with a high dependence of the PMD on the residual twist. In particular, the PMD variations around the minimum are more sensible in a high-spin fiber than in a low-spin fiber. Thus, a high spin rate requires a very accurate control of the de-twist imparted to the fiber. The Applicant has also observed that a strict control of the residual twist is difficult to achieve and that preferably the spin rate should be selected in a range below 8 turns/m to allow an accurate control of the residual twist.

In a further set of tests, the Applicant has compared the Differential Group Delays (DGD) of a substantially-constant unidirectionally spun fiber with the DGD of an unspun fiber and with the DGD of a bidirectionally spun fiber. The Applicant has finally considered a "hybrid" spin function, obtained by superposing an alternate spin to the substantially-contant unidirectional spin (the constant amplitude of the unidirectional component thus representing the average value of the hybrid function).

Figure 8A:
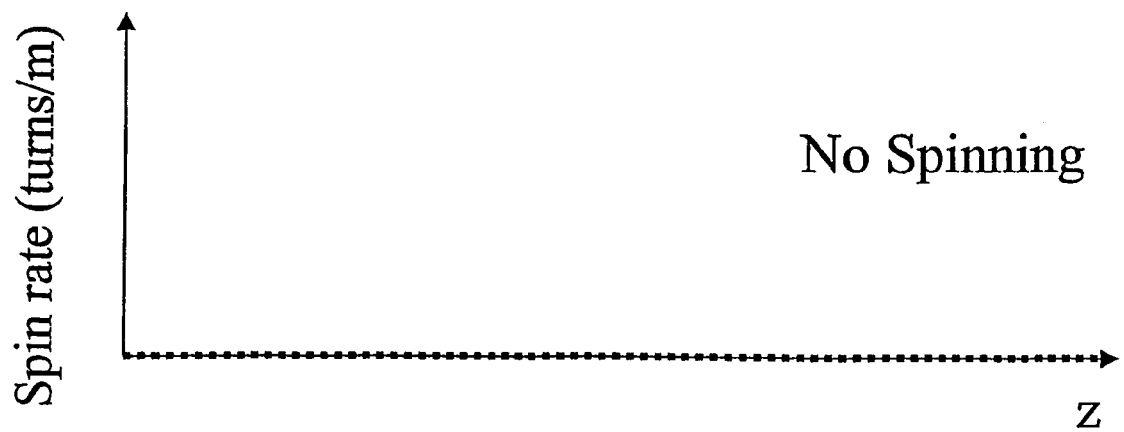
Figure 8B:
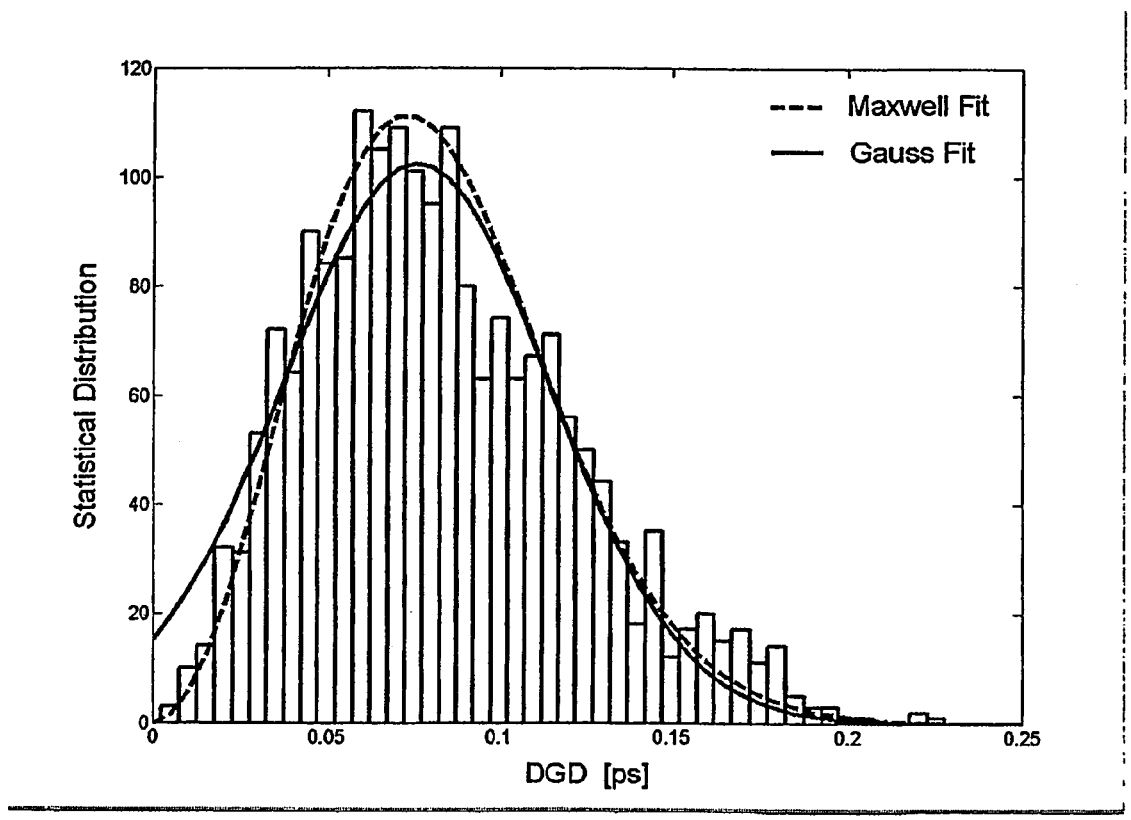

FIG. 8a shows the spin function of an un-spun fiber (i.e., a function identically equal to zero) and FIG. 8b illustrates the measured DGD distribution on a 1 km fiber. FIG. 8b shows that an unspun fiber is characterized by a statistical distribution of the measured DGD that is well fitted by a Maxwell distribution. The raw data provide a ratio (expectation value)/(standard deviation)≈2.2, very close to the 2.37 predicted by the theory for a Maxwell distribution. The Maxwell and Gauss fits have approximately the same chi-square value.

Figure 9A:
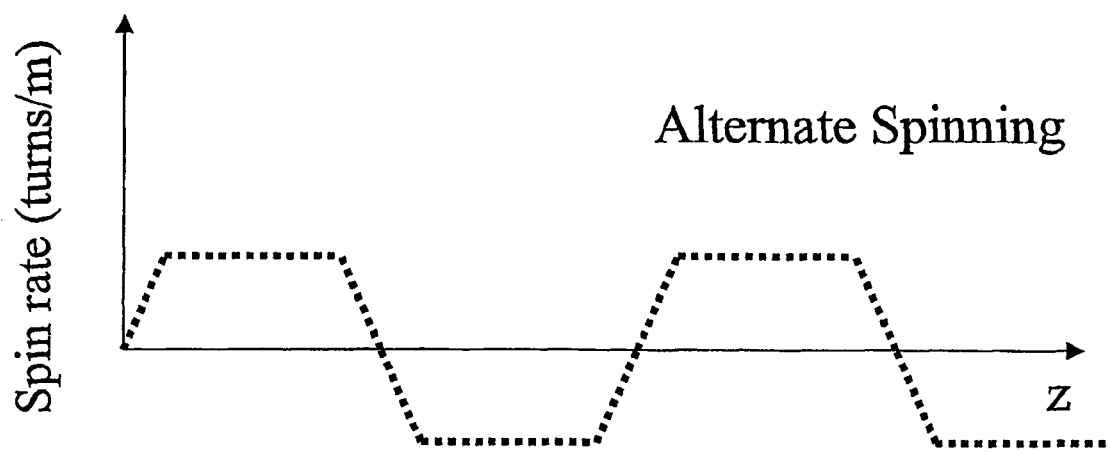
Figure 9B:
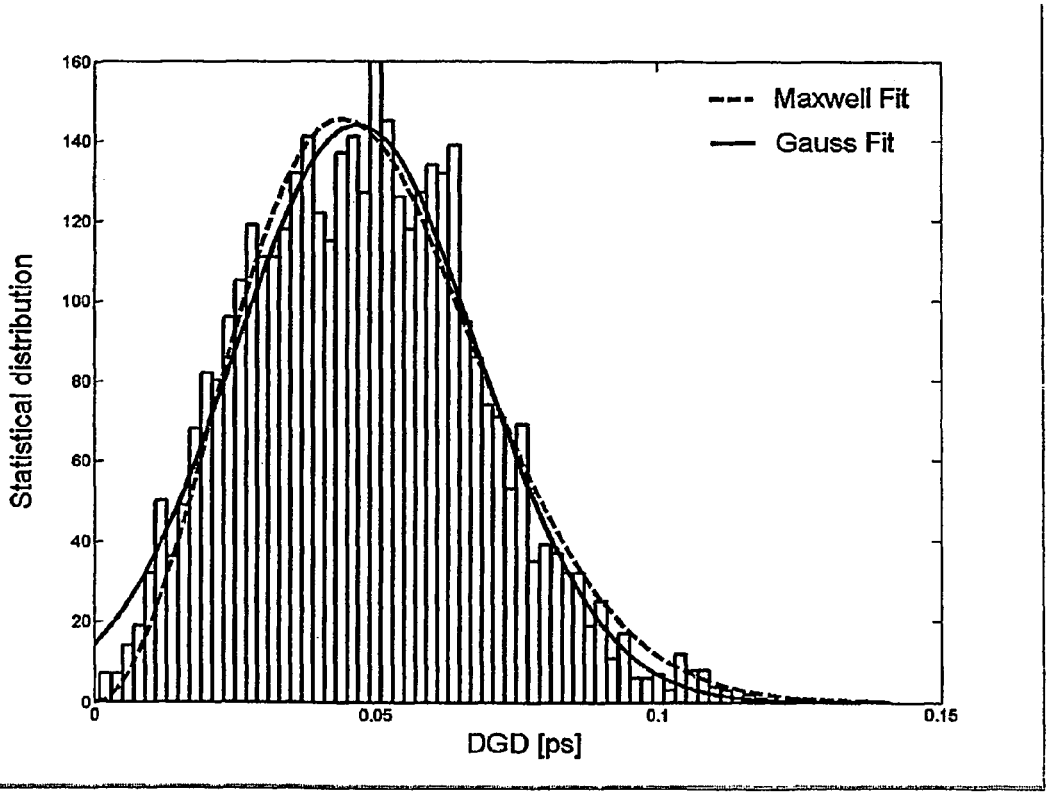

FIG. 9a shows the spin function of a bidirectionally spun fiber and FIG. 9b illustrates the measured DGD distribution on a 1 km fiber. FIG. 9b makes it apparent that also an alternatively spun fiber is characterized by a statistical distribution of the measured DGD that is well fitted by a Maxwell distribution. The raw data provide a ratio (expectation value)/(standard deviation)≈2.4, very close to the 2.37 predicted by the theory for a Maxwell distribution. The Maxwell and Gauss fits have approximately the same chi-square value.

Figure 10A:
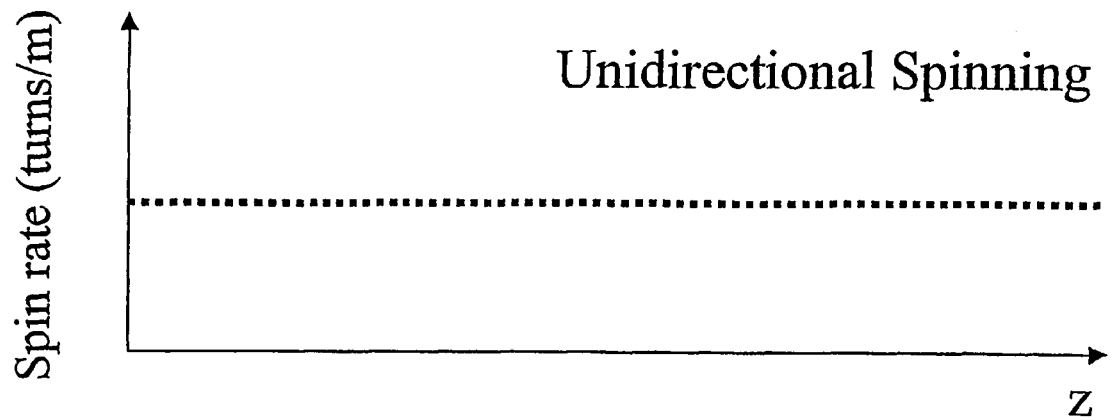
Figure 10B:
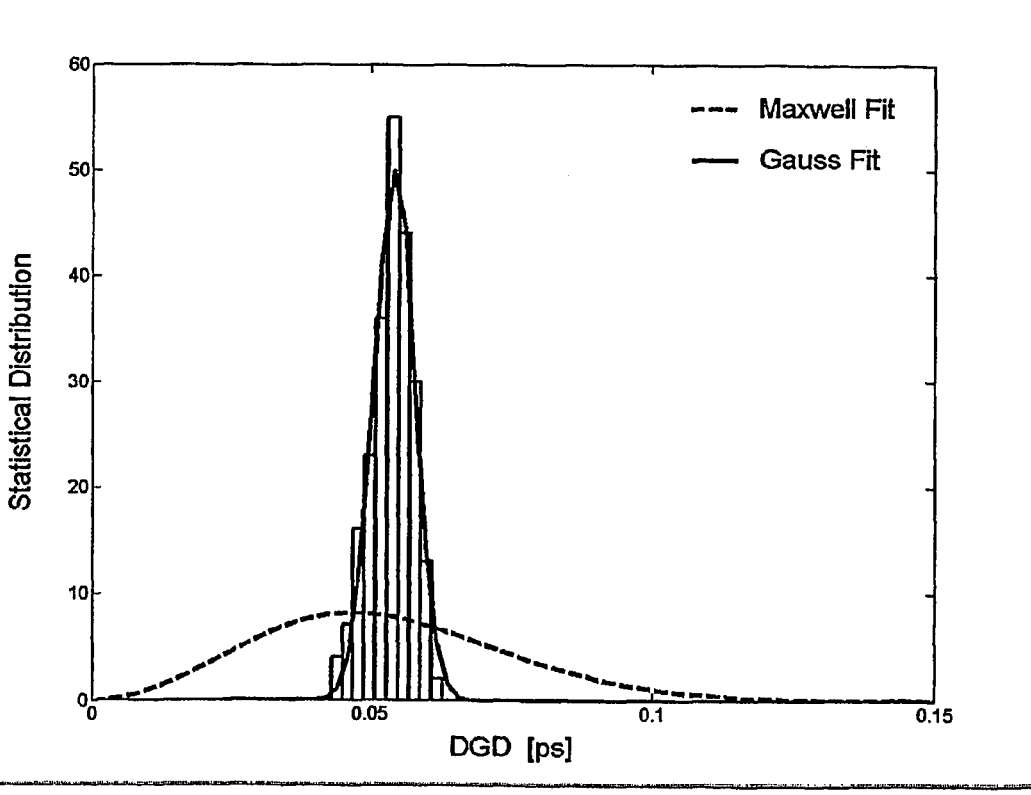

FIG. 10a shows the spin function of a unidirectionally spun fiber with constant spin rate, which has been subsequently detwisted according to the present invention so as to provide a PMD value equal to the bidirectionally fiber considered above. FIG. 10b shows the measured DGD distribution on a 1 km fiber.

It can be appreciated that the Differential Group Delay measured on a length of unidirectionally spun fiber of 1 km has a Gaussian-like statistical distribution. The Gauss fit provides a chi-square value that is approximately 50 times smaller than the one given by the Maxwell fit. The raw data and the Gauss fit provide the same ratio (expectation value)/(standard deviation)≈15, much larger than the 2.37 value of a Maxwell distribution.

The statistical characterization of the unidirectionally spun fiber has been repeated for different values of the detwisting parameter as shown in FIG. 7c. For each value of the residual twist, it has been verified that the statistical distribution of the DGD always remains Gaussian-like and always maintains the same (expectation value)/(standard deviation) ratio.

Figure 11A:
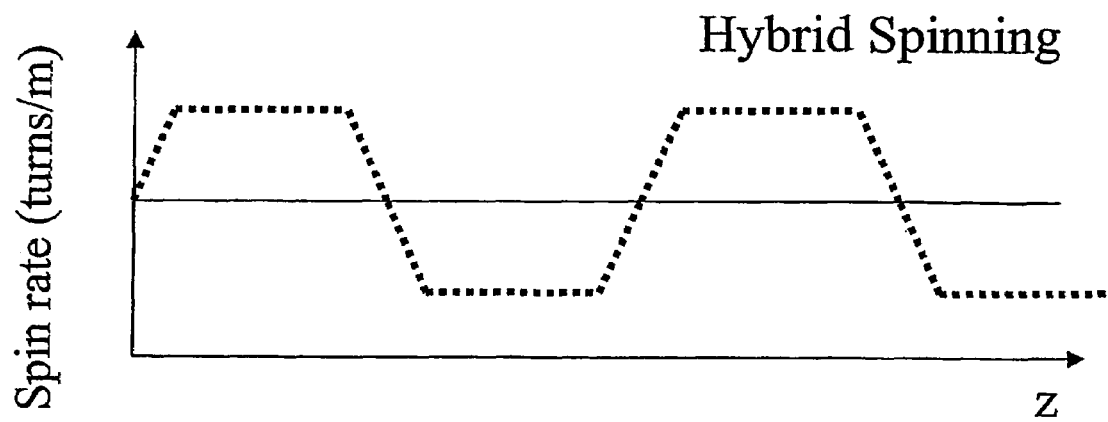
FIG. 11a shows a "hybrid" spin function.
Figure 11B:
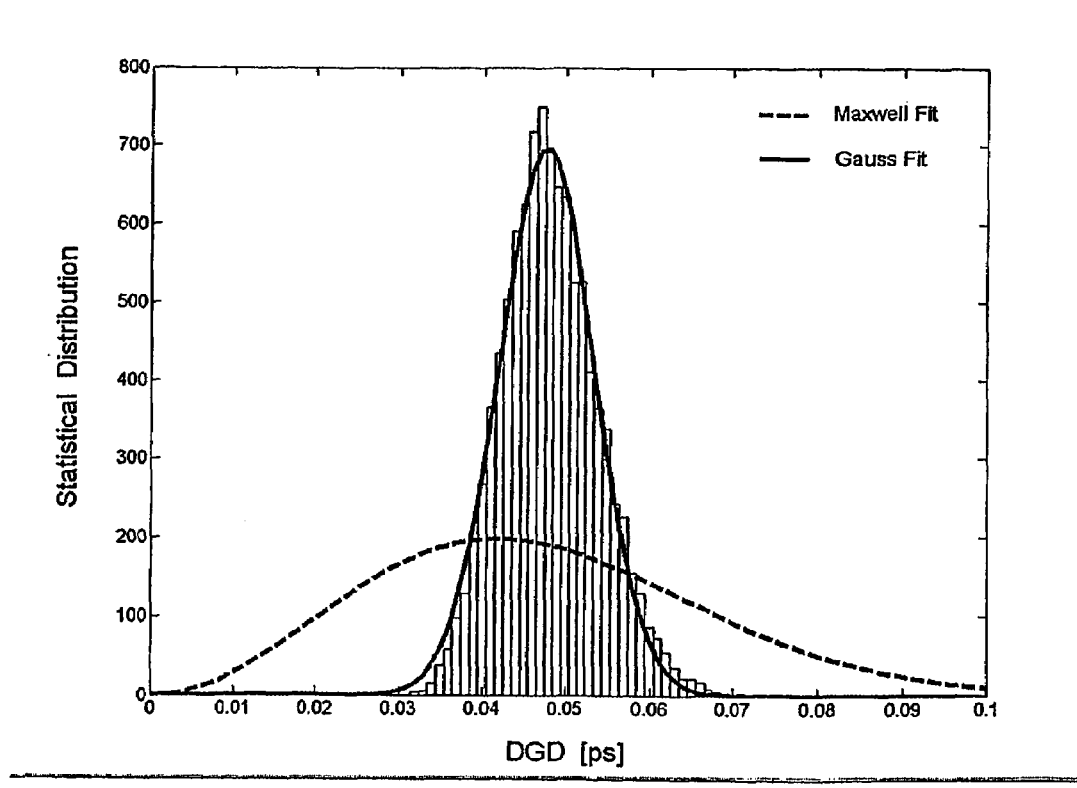
FIG. 11b shows the DGD distribution of the hybrid spun fiber obtained by a numerical simulation.

FIG. 11a shows a "hybrid" spin function and FIG. 11b shows the DGD distribution of the hybrid spun fiber obtained by a numerical simulation. The simulation is based on the theoretical approach described in P. K. A. Wail and C. R. Menyuk, "Polarization mode dispersion, decorrelation, and diffusion in optical fibers with randomly varying birefringence", IEEE J. Lightwave Tech., 1996, Vol. 14, pp. 148-157, with the beat length Lb and the correlation length Lf set to typical fiber values. The Applicant has verified that the same simulation performed on the unspun fiber of FIG. 8a, on the bidirectionally spun fiber of FIG. 9a and on the unidirectionally spun fiber of FIG. 10a, gave results that matched with those obtained experimentally (FIGS. 8b, 9b and 10b), thus confirming the reliability of the measurement. As can be seen, hybrid spinning maintains low PMD values with sub-Maxwellian DGD distribution.

The above results therefore show that the process of unidirectionally spinning an optical fiber alters the statistical properties of its PMD. While unspun and alternatively spun fibers obey a Maxwell statistical distribution, unidirectionally spun fibers exhibit, at least for certain lengths of fiber, a Gauss distribution characterized by a high reduction of data dispersion. In addition, the choice of the detwisting rate, and thus of the residual fiber twist, allows to minimize the PMD value.

What is claimed is:

1. A process for producing a low-PMD optical fiber, comprising:
   drawing a glass preform into an optical fiber;
   spinning the optical fiber unidirectionally about its axis during drawing, causing the optical fiber to undergo an elastic torsion;
   winding the optical fiber onto a reel; and
   twisting the spun optical fiber about its axis in a direction opposite the direction of said elastic torsion, for controlling said elastic torsion.

2. The process according to claim 1, wherein twisting comprises imparting a twist to the optical fiber that is greater in module than said elastic torsion, so as to provide the optical fiber with a residual torsion.

3. The process according to claim 1, wherein twisting the spun optical fiber is performed at a substantially constant rate.

4. The processing according to claim 2, wherein the residual torsion is in module between 0 and about 1.5 turns/m.

5. The process according to claim 2, wherein the residual torsion is in module between about 0.3 and 1 turn/m.

6. The process according to claim 1, wherein spinning the optical fiber is performed at a substantially constant rate.

7. The process according to claim 1, wherein spinning the optical fiber is performed at a variable rate.

8. The process according to claim 7, wherein spinning the optical fiber is performed according to a spinning function obtained by superposing a constant function and a periodic function.

9. The process according to claim 1, wherein spinning the optical fiber is performed at a rate between about 1 and 8 turns/m.

10. The process according to claim 1, wherein twisting the optical fiber is performed while winding the optical fiber onto the reel.

11. The process according to claim 1, further comprising the steps of unwinding the optical fiber from said reel and rewinding the optical fiber onto a further reel, wherein twisting to the optical fiber is performed while unwinding the optical fiber or while rewinding the optical fiber.

12. An apparatus for producing a low-PMD optical fiber, comprising:
   a furnace for melting a lower portion of an optical preform;
   a traction device for pulling an optical fiber from the lower portion of the optical preform;
   a spinning device for imparting a unidirectional spin to the optical fiber about its axis as it is pulled, in such a way that the optical fiber undergoes an elastic torsion;
   a winding device for winding the optical fiber onto a reel; and
   a twisting device for imparting to the spun optical fiber a twist about its axis in a direction opposite said elastic torsion.

13. The apparatus of claim 12, wherein the twisting device is associated to the winding device.

14. The apparatus of claim 12, further comprising an unwinding device for unwinding the optical fiber from the reel, the twisting device being associated to the unwinding device.

15. The apparatus of claim 12, further comprising at least a coating device for applying at least a protective coating to the optical fiber as it is pulled, the spinning device being positioned between the at least a coating device and the traction device.

16. An optical cable, comprising at least an optical fiber having a unidirectional intrinsic spin and an elastic twist that is substantially null or opposite said spin and greater than zero in module.

17. The optical cable of claim 16, wherein said unidirectional intrinsic spin is substantially constant.

18. The optical cable of claim 16, wherein the elastic twist is in module between 0 and about 1.5 turns/m.

19. The optical cable of claim 17, wherein the elastic twist is in module between about 0.3 and 1 turn/m.

20. The optical cable of claim 16, wherein the intrinsic spin is in module between about 1 and 8 turns/m.

21. An optical fiber having a unidirectional intrinsic spin and an elastic twist that is substantially null or opposite said spin and greater than zero in module.

22. The optical fiber of claim 21, wherein the unidirectional intrinsic spin is substantially constant.

23. The optical fiber of claim 21, wherein the elastic twist is in module between 0 and about 1.5 turns/m.

24. The optical fiber of claim 23, wherein the elastic twist is in module between about 0.3 and 1 turn/m.

25. The optical fiber of claim 21, wherein the intrinsic spin is in module between about 1 and 8 turns/m.

* * * * *